(12) United States Patent
Smith et al.

(10) Patent No.: US 8,763,158 B2
(45) Date of Patent: Jun. 24, 2014

(54) DIRECTORY SERVICE DISTRIBUTED PRODUCT ACTIVATION

(75) Inventors: Aaron J. Smith, Kenmore, WA (US); Ajay Bhave, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 12/961,187

(22) Filed: Dec. 6, 2010

(65) Prior Publication Data

US 2012/0144502 A1  Jun. 7, 2012

(51) Int. Cl.
- G06F 17/30 (2006.01)
- H04L 29/06 (2006.01)
- G06F 12/14 (2006.01)
- G06F 21/00 (2013.01)

(52) U.S. Cl.
USPC ............. 726/30; 713/165; 713/166; 713/189; 705/51; 705/57; 705/59

(58) Field of Classification Search
USPC ......... 726/30; 713/165, 166, 189; 705/51, 57, 705/59
See application file for complete search history.

(56) References Cited

U.S. PATENT DOCUMENTS

| | | | |
|---|---|---|---|
| 6,105,069 A * | 8/2000 | Franklin et al. ............ | 709/229 |
| 6,169,976 B1 | 1/2001 | Colosso | |
| 6,188,995 B1 | 2/2001 | Garst et al. | |
| 7,331,063 B2 | 2/2008 | Gunyakti et al. | |
| 7,356,709 B2 | 4/2008 | Gunyakti et al. | |
| 7,644,442 B2 | 1/2010 | Miller et al. | |
| 2003/0212905 A1 * | 11/2003 | Tran et al. .................. | 713/201 |
| 2004/0039705 A1 | 2/2004 | Svancarek et al. | |
| 2005/0165692 A1 * | 7/2005 | Tyrvainen ................. | 705/59 |
| 2005/0210254 A1 * | 9/2005 | Gabryjelski et al. ......... | 713/175 |
| 2006/0265337 A1 * | 11/2006 | Wesinger, Jr. ............. | 705/65 |
| 2007/0027815 A1 | 2/2007 | Sobel et al. | |
| 2008/0172560 A1 * | 7/2008 | Hughes et al. ............. | 713/176 |

(Continued)

FOREIGN PATENT DOCUMENTS

CN  1831836 A  9/2006

OTHER PUBLICATIONS

Volume Activation 2.0 Overview Guide—Published Date: Mar. 2008.

(Continued)

Primary Examiner — Aravind Moorthy
(74) Attorney, Agent, or Firm — John Jardine; Andrew Sanders; Micky Minhas

(57) ABSTRACT

In some embodiments, an activation object used to activate a software product is stored in a directory service. The activation object may, for example, comprise a proof of purchase token and/or information about the directory service, and may be communicated from the directory service to a client computer after the directory service authenticates a request from a client computer for access to the activation object. In some embodiments, a directory service is interrogated for an activation object used to activate software on a client computer. A client computer may, for example, receive an activation object from the interrogated directory service, and use the received activation object to activate a software product on the client computer. In some embodiments, a non-transitory computer-readable medium has instructions stored thereon that, when executed by a computer, cause the computer to interrogate a directory service for an activation object used to activate software on the computer. The computer may, for example, receive the activation object from the directory service, and use the received activation object to activate a software product.

20 Claims, 3 Drawing Sheets

(56) References Cited

U.S. PATENT DOCUMENTS

| | | | |
|---|---|---|---|
| 2008/0189559 A1* | 8/2008 | Delfs | 713/193 |
| 2009/0006259 A1* | 1/2009 | Hsi | 705/59 |
| 2009/0018962 A1* | 1/2009 | Ying et al. | 705/51 |
| 2009/0204544 A1 | 8/2009 | Eizenhoefer et al. | |
| 2009/0208016 A1* | 8/2009 | Choi et al. | 380/277 |
| 2009/0259591 A1* | 10/2009 | Starostin et al. | 705/59 |
| 2009/0285120 A1* | 11/2009 | Swan | 370/254 |

OTHER PUBLICATIONS

Office Action dated Feb. 24, 2014 in CN Pat. App. No. 201110400471.8, 14 pages, including partial translation.

* cited by examiner

US 8,763,158 B2

DIRECTORY SERVICE DISTRIBUTED PRODUCT ACTIVATION

BACKGROUND

Software product activation may function as a proof of purchase, typically as part of a software publisher's anti-piracy strategy. Enforcement mechanisms can be tied to product activation such that the software behaves or displays differently based on the presence or absence of a proof of purchase. Many software activation solutions exist today and are used by various software publishers. These solutions typically associate (i.e., bind) the software with the individual computer on which it runs.

For an organization to use software that requires product activation, these enforcement measures create a cost overhead for maintaining, securing, delivering and managing proofs of purchase across the individual computers. Various strategies and designs have been created to reduce this additional cost of ownership while still protecting the intellectual property of the software publisher. These solutions, however, suffer various drawbacks. Many are unsecured, and others are prohibitively expensive to deploy or maintain.

One solution to this problem is the Key Management Service (KMS) deployed by Microsoft for Windows® and other applications. Certain features of KMS are described, for example, in U.S. Pat. No. 7,356,709, which is incorporated herein by reference in its entirety. KMS is discoverable by clients in an organization's network automatically and without restriction. As customers are thus responsible for securing access to KMS, it may not be sufficiently secure for some environments. Additionally, KMS is deployed using host hardware and communicates using a remote procedure call (RPC) protocol, which is often blocked within secure networks.

Another solution is described in U.S. Patent Application Pub. No. U.S. 2009/0204544. That solution uses a PKI proof of purchase solution for high security and military use. Such a solution is not suitable for many organizations because of its complexity.

SUMMARY

In some embodiments, an activation object used to activate a software product is stored in a directory service. The activation object may, for example, comprise a proof of purchase token and/or information about the directory service, and may be communicated from the directory service to a client computer after the directory service authenticates a request from a client computer for access to the activation object.

In some embodiments, a directory service is interrogated for an activation object used to activate software on a client computer. A client computer may, for example, receive an activation object from the interrogated directory service, and use the received activation object to activate a software product on the client computer.

In some embodiments, a non-transitory computer-readable medium has instructions stored thereon that, when executed by a computer, cause the computer to interrogate a directory service for an activation object used to activate software on the computer. The computer may, for example, receive the activation object from the directory service, and use the received activation object to activate a software product.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
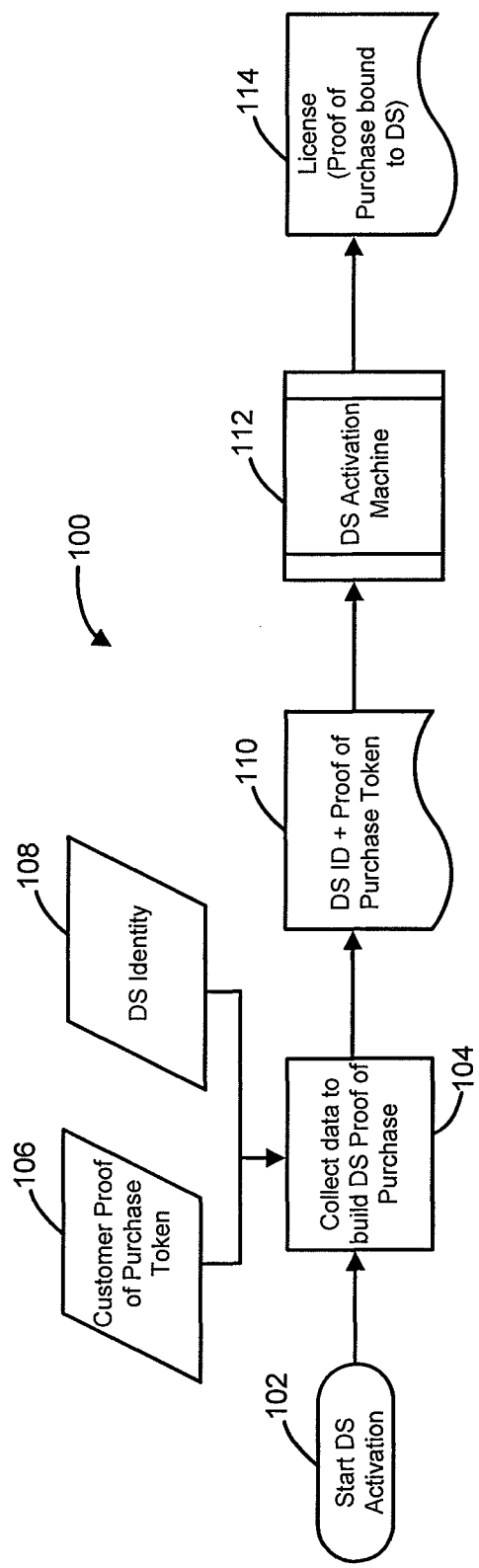
FIG. 1 is a flow chart illustrating an example of a process that may be used to activate a directory service with a license for a software product.

In some embodiments, product activation may be effected using a directory service employed by an enterprise, such as Microsoft's Active Directory®. In particular, in some embodiments, such a directory service may store and deliver proof of purchase for software activation to client computers. This solution may, for example, utilize the directory service by binding a unique token such as a product key to the unique ID of the directory service. This may be done, for example, by cryptographically securing the data in a license or other blob of data.

The client computers, once authenticated by the directory service, may gain access to this license and the software may use it as a proof of purchase, thus becoming "activated." As used herein, "proof of purchase" refers to data that establishes proof that something has been legitimately purchased, and "activation" refers to any technology that alters the functionality of software based on proof of purchase.

As used herein, a "directory" refers to a store that contains information about objects on a network, and a "directory service" refers to a service that provides methods for storing directory data and making such data available to network users and administrators. Microsoft's Active Directory®, for example, stores information about user accounts, such as names, passwords, phone numbers, and so on, and enables other authorized users on the same network to access such information.

A simple directory service may, for example, comprise a database of users, access controls lists, and network resources. A directory service may thus function as a centralized authentication mechanism and a directory of available resources on a network. Examples of directory services with which aspects of the invention described herein may be employed include Microsoft Active Directory®, Novell Directory Service, Netware Directory Service, Zimbra, etc.

As used herein, a "license" refers to a collection of data used for authorization. A license may, for example, comprise a collection of information that includes both directory service information and information about the proof of purchase token. Either alone, or together with other data, such a license may authorize the associated software to run (activate).

The directory service-based product activation techniques described herein may leverage the strength, maturity, and industry saturation of directory services to simplify product activation and improve the protection of intellectual property (IP) against theft or abuse. The use of such techniques from the customer's perspective may be quite simple. First, the customer may activate a directory service with a product key or other token provided by the software publisher. This may be used to create a proof of purchase stored in the directory service. When the software runs on a computer that authenticates to the directory service, the software may automatically collect and evaluate the proof of purchase. If all requirements are met, the software may be activated. In some embodiments, the collection and evaluation of the proof of purchase may be transparent to the user. In other embodiments, the user may be apprised, e.g., by a displayed message and/or icon, that either or both of such steps are being performed.

When implemented by a software publisher, a directory-based software activation solution may reduce the customer's total cost of ownership (TCO), simplify product activation, resolve many of the activation difficulties faced by virtualized systems, resolve the sovereignty concerns of many national governments that face issues of product activation, and eliminate much of the support call expense that software publishers face when software activation is required.

FIG. 1 is a flow chart illustrating an example of a process 100 that may be used to activate a directory service with a license for a software product. It should be appreciated that the specific requirements and operations needed to activate a license may vary from software vendor to software vendor, and it is not necessary to perform all of the particular steps depicted to practice aspects of the invention.

As shown in FIG. 1, the directory service activation process 100 may begin at a step 102. The process may begin, for example, at the initiative of a system administrator responsible for deploying software resources within an organization.

At the step 104, some suitable process may be used to collect information from the customer that can be used to associate the customer's existing directory service with the software license being activated. Such information collection may, for example, be achieved using an online interface, by telephone, or using some other form of communication with a remote service, or perhaps by a process running locally on a customer machine, depending on rules defined by the software publisher. In the example shown, the customer may supply both a proof of purchase token 106 and directory service identity information 108 in connection with the collection process 104. The proof of purchase token 106 may, for example, comprise a product key, password, PIN, certificate, hardware key or dongle, file, etc. The directory service identity information 108 may, for example, comprise an identifier of the root domain of an active directory forest, which may or may not have one or more child domains. The user may also optionally be prompted to supply a name for the license being activated. If no name is supplied, a default name may be assigned as the label of the customer-specific token or otherwise. The information collection process may be automated either entirely or in part through the use of an installation wizard or the like.

As shown, the collected information may be supplied 110 to a directory service activation machine 112, which may produce an appropriately secured license 114 containing information about both the token and the activated directory service. The activation machine 112 may take on any of numerous forms, and the invention is not limited to the use of any particular type or form of device for activation. The activation machine 112 may, for example, exist online, on the local network, or on the local machine. The activation machine 112 may also be contacted via non-network communications including, for example, telephone, SMS (text), file transfer, local calculation, or other mechanisms. The license 114, which may alternatively be referred to as an "activation object," may be digitally signed or otherwise secured cryptographically or in some other way, or may be stored in the clear. It is preferable, however, that some mechanism exist in the client-activation phase to ensure that the data in the activation object 114 has not been altered, such that software can trust the activation object.

The activation objects 114 may take on any of numerous forms, and the invention is not limited to the use of data of any particular type or format. The activation objects 114 may, for example, comprise XrML licenses, signed files, binary blobs, database records, registry entries, system policy values, system memory, etc. In some embodiments, the data in the activation objects 114 cannot be edited. In some embodiments, the activation objects 114 may include additional data used for authentication, validation, software activation, or for any other related purpose. Examples of additional data that may be used for such purposes include check sums, time/date stamps, source data, control data, bit masks, human readable names, etc.

The activation object 114 may then be stored in the directory service. Directory services may use organizational units of any of numerous types, and the invention is not limited to the use of any particular type of organizational unit for such a service. In some embodiments, the directory service may, for example, use domains (e.g., "microsoft.com") as its organizational unit. The Microsoft Active Directory® is one example of such a directory service. In other embodiments, however, the directory service may use a different type of organizational unit. Accordingly, although certain embodiments are described herein as employing domains as their organizational unit, it should be appreciated that any other organizational unit could alternatively be employed and that such embodiments may instead be implemented with a directory service that uses some other organizational unit.

In some embodiments, the directory service may have a multiple domain structure, which may be referred to as a "forest," comprising a root domain and one or more child domains. Each such child domain may depend either from the root domain or from another child domain, so as to form one or more layers of nested domains. In some embodiments, each domain may have an internal hierarchy of permissions, rights, etc., and child domains may inherit policies and/or properties from other domains from which they depend. In some embodiments, for example, each child domain may be governed by policies and/or properties of the domain from which it directly depends. Accordingly, in some embodiments, trust, rights, permissions, and other information travel through the forest along the chains of inheritance amongst the domains. In other embodiments, a directory service may comprise only a single domain, in which case the single domain may constitute the entire forest and also be the root domain of that forest.

In some embodiments, activation objects 114 may be stored in a container in the root domain of the directory service, so as to be accessible to client software on any computer in the forest, according to any access restrictions that the customer implements on the environment. If an appropriate container does not already exist in the root domain of the directory service, one may be created. For an implementation using the Microsoft Active Directory®, for example, an activation object container may be created as a table in the Lightweight Directory Access Protocol (LDAP) database, and activation objects 114 may be stored in such a table. In some embodiments, activation objects 114 may additionally contain information identifying the version of the software product being activated. Additionally or alternatively, data identifying the version of the software product being activated may be stored in the directory service along with an activation object 114, e.g., as a separate entry in the database row containing the activation object. In some embodiments, the directory service may contain a pointer the location of each activation object 114.

In some embodiments, the customer's directory service may regulate access to access objects 114 it stores, for example, by authenticating client computers, user accounts, or other credentials. Examples of authentication mechanisms may, for example, include account/password pairs, pre-shared secrets, cryptographic keys (including traditional product keys), PKI certificates, biometrics, or any other authentication mechanism used to identify and authorize access to resources linked to the directory service by confirming the association of the client computer and/or the user of the client computer to the directory service. A customer token may thus be bound to the directory service, to associate authenticated clients with the proof of purchase.

Figure 2:
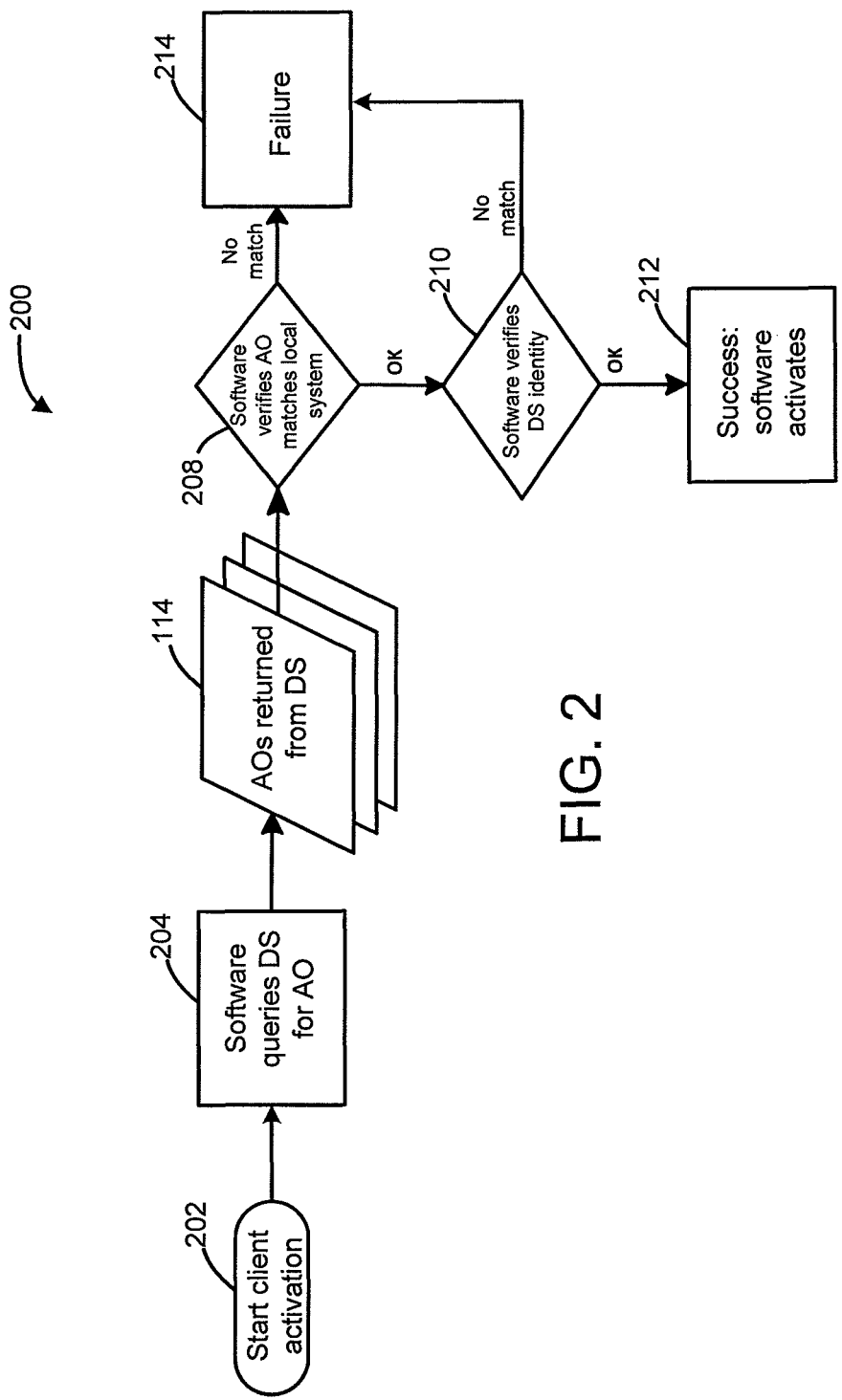
FIG. 2 is a flow chart illustrating a routine that may be used to activate software products for clients.

FIG. 2 is a flow chart illustrating a routine 200 that may be used to activate software products for clients. As shown, the routine may begin at a step 202, when a determination is made that a piece of client software requires activation. The nature of events that will trigger the need for activation may, for example, be determined by the software publisher. Software activations may have different durations (or may be of an unlimited duration), and may be necessitated based various criteria, such as time, system state, etc., at the discretion of the publisher or otherwise. In some embodiments, the client software will be aware of the existence of the directory service and the method(s) that can be used to extract one or more activation objects from its data store.

At step 204, the software may query the directory service for any applicable activation objects 114. The activation objects 114 may be filtered for applicability by the directory service, or all available activation objects 114 may be returned and filtered later by the client. Either way, the client may evaluate each returned activation object 114 against local data (step 208) and data about the directory service (step 210). The step 208 may, for example, involve a comparison of the version of the to-be-activated software with version data contained in or returned along with the activation object 114. The step 210 may, for example, involve an evaluation of the directory service identity information (e.g., a domain) contained in the activation object 114 against the network domain of the client computer. If the local data and directory service information match, then the software is successfully activated (step 212). Otherwise, the activation attempt fails (step 214).

Although not shown in FIG. 2, the routine 200 may additionally involve the verification of the validity of a digital signature, if any, included within or accompanying the activation object 114, or some other process for verifying that the activation object 114 can be trusted.

By way of the foregoing process, any computer authenticated to the customer's existing directory service or other authentication mechanism may be automatically allowed to use the customers' proof of purchase, for the purpose of activating software or otherwise.

Embodiments of the above processes may, for example, be used for operating system activation, subscription activation, enlistment authorization, or any other circumstance where activation or authorization of a software product is desired. In some embodiments, for example, Microsoft Windows® may query the Microsoft Active Directory®, or some other directory service, for an activation object 114 on each start up, or perhaps only until it successfully activates a first time. As another example, Microsoft Office® may query the Microsoft Active Directory®, or another directory service, for an activation object 114 in order to print.

Figure 3:
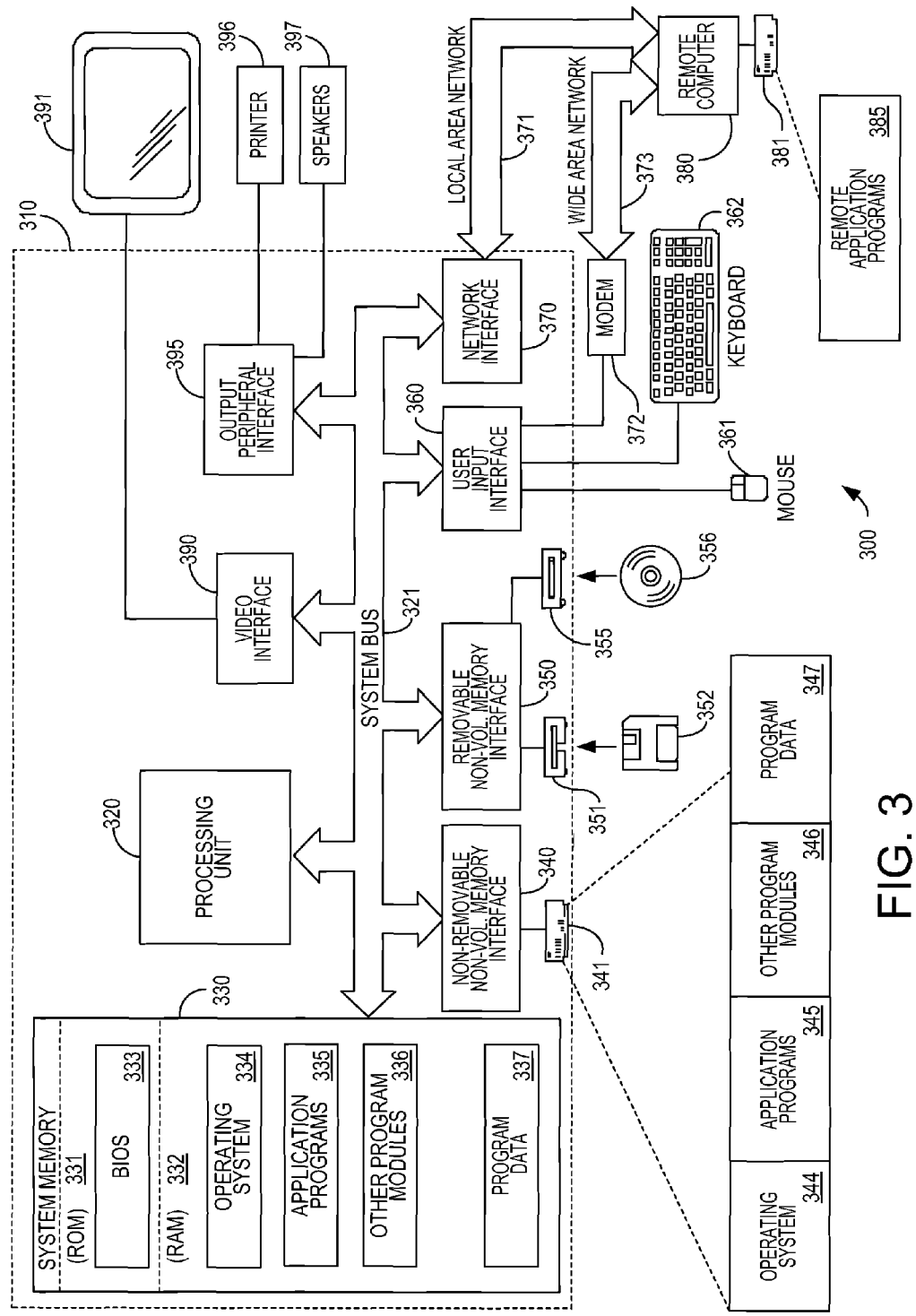
FIG. 3 illustrates an example of a suitable computing system environment 300 with which various embodiments of the invention may be implemented.

FIG. 3 illustrates an example of a suitable computing system environment 300 with which various embodiments of the invention may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, smartphones, tablets/pads, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing embodiments of the invention includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. It should be appreciated, however, that a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method of enabling activation of a software product, comprising:
    storing on a server computing device, an activation object in a root portion of a multi-portioned hierarchical directory service, wherein the activation object includes information to enable activation of the software product by a client computing device that is associated with the multi-portioned hierarchical directory service, and wherein the multi-portioned hierarchical directory service is also configured to store a directory of network resources available on a network of an organization;
    receiving, by the multi-portioned hierarchical directory service, a request from the client computing device for the activation object; and
    in response to receiving the request, transmitting, by the multi-portioned hierarchical directory service, the activation object to the client computing device.

2. The method of claim 1, further comprising:
    providing, by the multi-portioned hierarchical directory service, information from the directory of network resources to the client computing device.

3. The method of claim 1, wherein the multi-portioned hierarchical directory service and the client computing device are both within a shared network domain.

4. The method of claim 3, wherein the activation object further comprises an identification of the multi-portioned hierarchical directory service.

5. The method of claim 1, wherein the activation object is cryptographically bound to an identification of the multi-portioned hierarchical directory service.

6. The method of claim 1, further comprising:
    prior to transmitting the activation object, authenticating the request for the activation object.

7. A method, operable on a processor, of activating a software product, comprising:
- requesting an activation object from a directory service operating on a server computing device, wherein the directory service is configured to provide the activation object to computing devices of an organization from a root domain of the directory service, and is further configured to serve a directory of network resources available on a network of the organization;
- receiving the activation object; and
- employing the activation object to activate the software product.

8. The method of claim 7, wherein employing the activation object includes:
- verifying a correspondence between an identifier of the software product in the activation object with an identifier of the software product;
- verifying another correspondence between a unique identifier of the directory service that is contained within the activation object and a network membership identifier of the client computing device; and
- activating the software product on the client computing device.

9. The method of claim 8, wherein the activation object and the directory service each includes data identifying an organization that operates the directory service.

10. The method of claim 8, wherein employing the activation object further includes:
- decrypting the activation object.

11. The method of claim 7, wherein the activation object is an eXtensible Rights Markup Language (XrML) license.

12. The method of claim 11, wherein the activation object includes a checksum, a time stamp, and a bit mask.

13. The method of claim 7, further comprising:
- receiving information from the directory of network resources served by the directory service.

14. A computer-readable storage medium having instructions stored thereon that enable a computer to perform operations comprising:
- requesting, from a root portion of a multi-portioned hierarchical directory service on a server computing system, an activation object, wherein the multi-portioned hierarchical directory service is configured to provide the activation object to computing devices of an organization from the root portion and is further configured to serve, to the computing devices of the organization, a directory of network resources available on a network of the organization;
- receiving the activation object from the multi-portioned hierarchical directory service; and
- employing the received activation object to activate a software product on the client computer.

15. The computer-readable storage medium of claim 14, wherein the operations further comprise:
- comparing data in the activation object with data associated with the software product to verify correspondence therebetween.

16. The computer-readable storage medium of claim 15, wherein the operations further comprise:
- comparing additional data in the activation object with data identifying the multi-portioned hierarchical directory service to verify correspondence therebetween.

17. The computer-readable storage medium of claim 14, wherein the operations further comprises:
- comparing data in the activation object with data identifying the multi-portioned hierarchical directory service to verify correspondence therebetween.

18. The computer-readable storage medium of claim 17, wherein the data in the activation object and the data identifying the multi-portioned hierarchical directory service each identify an organizational unit of the organization, and wherein the organization operates the multi-portioned hierarchical directory service.

19. The computer-readable storage medium of claim 14, wherein the operations further comprise:
- employing a cryptographic method to authenticate the activation object.

20. The computer-readable storage medium of claim 14, wherein the activation object comprises a proof of purchase token and information regarding the multi-portioned hierarchical directory service.

* * * * *